US007578493B2

(12) United States Patent
Lovell

(10) Patent No.: US 7,578,493 B2
(45) Date of Patent: Aug. 25, 2009

(54) AUDIO/VISUAL UNIT SECURITY APPARATUS

(76) Inventor: Raymond R. Lovell, 4836 NE. 12th Ave., Ft. Lauderdale, FL (US) 33334

( * ) Notice: Subject to any disclaimer, the term of this patent is extended or adjusted under 35 U.S.C. 154(b) by 1270 days.

(21) Appl. No.: 10/686,488

(22) Filed: Oct. 15, 2003

(65) Prior Publication Data
US 2004/0080665 A1 Apr. 29, 2004

Related U.S. Application Data

(60) Provisional application No. 60/418,548, filed on Oct. 15, 2002.

(51) Int. Cl.
F16M 13/00 (2006.01)
(52) U.S. Cl. .................. 248/551; 248/324; 353/119; 361/FOR. 104
(58) Field of Classification Search .......... 248/551, 248/317, 324, 326, 323, 923, 921, 922, 919; 312/245, 246; 353/119, 72, 79, 122; 396/419, 396/428; 361/724, 726, FOR. 104, FOR. 105; 348/373, 151
See application file for complete search history.

(56) References Cited

U.S. PATENT DOCUMENTS

| 4,964,606 | A | * | 10/1990 | Beam et al. | 248/333 |
| 6,328,270 | B1 | * | 12/2001 | Elberbaum | 248/288.31 |
| 6,739,096 | B2 | * | 5/2004 | Feldpausch et al. | 52/36.1 |
| 7,029,133 | B2 | * | 4/2006 | Challis | 353/119 |
| 7,156,359 | B2 | * | 1/2007 | Dittmer et al. | 248/551 |
| 2003/0234335 | A1 | * | 12/2003 | Umberg | 248/551 |
| 2004/0211872 | A1 | * | 10/2004 | Dittmer et al. | 248/323 |
| 2006/0284046 | A1 | * | 12/2006 | Umberg | 248/551 |
| 2007/0034764 | A1 | * | 2/2007 | Dittmer et al. | 248/324 |

* cited by examiner

Primary Examiner—A. Joseph Wujciak, III
(74) Attorney, Agent, or Firm—Christopher & Weisberg, P.A.

(57) ABSTRACT

An audio/visual unit security apparatus for mounting and enclosing an audio/visual unit to allow for maneuverability of the unit while providing a mechanical security collar that protects the mount-enclosure interface in order to prevent and deter theft of the audio/visual unit. A ceiling-mounted audio/visual unit security apparatus is provided that includes a height adjustable mounting assembly. The mounting assembly includes a support column affixed at one end to an upper support surface, such as the upper ceiling of a crawlspace or attic. A height adjustable mounting column is adjustably mounted alongside the support column. The lower portion of the mounting column extends below a lower support surface, which represents the ceiling of a room below the crawlspace where an audio/visual unit is to be suspended. The lower portion of the mounting column is rotatably coupled to a locking assembly. The locking assembly includes an enclosure for housing the audio/visual unit and a security collar for removably receiving the mounting column and for covering exposed portions of the mounting column. The security collar includes security links, which provide a further layer of protection by covering the exposed column mount and coupling the yoke through which the lower end of the column mount protrudes, to the jacket. The jacket includes a hinged door to allow for easy insertion and/or removal of the audio/visual unit. The audio/visual unit security apparatus may be mounted to a wall by coupling a substantially horizontal extension member to the column mount and rotatably coupling the unit jacket thereto.

2 Claims, 3 Drawing Sheets

AUDIO/VISUAL UNIT SECURITY APPARATUS

CROSS-REFERENCE TO RELATED APPLICATION

This application is related to and claims priority to U.S. Provisional Patent Application Ser. No. 60/418,548, filed Oct. 15, 2002, entitled SECURITY AND MOUNTING SYSTEM FOR CEILING-MOUNTED PROJECTOR, the entirety of which is incorporated herein by reference.

STATEMENT REGARDING FEDERALLY SPONSORED RESEARCH OR DEVELOPMENT n/a

FIELD OF THE INVENTION

The present invention relates to audio/visual device security systems and more specifically to an audio-visual device security system that mounts and houses an audio-visual unit while protecting the unit from theft and/or damage, while allowing for complete and unencumbered operation of the audio-visual device.

BACKGROUND OF THE INVENTION

Theft of ceiling-mounted audio/visual projectors, videocassette recorders, televisions and other types of audio/visual units (hereinafter "AV units") from public institutions has become increasingly common in recent years. Millions of dollars are lost each year, particularly in schools, daycare centers and other educational facilities, due to the theft and/or damage of ceiling and/or wall-mounted AV units, in particular, projectors. The common procedure is for intruders to ascertain when the vulnerable time periods are for projector-equipped classrooms, then simply remove the projector from its mounting column using the quick service disconnect and carrying the projector off campus in large book bags etc. In larger campuses, many classrooms are not used, providing intruders with ample opportunities to enter the classrooms and remove the projectors. Although efforts have been made to secure the projectors by enclosing them in housings, thieves are willing to attack the projector mount both above and below the ceiling from which the projector is suspended. Thieves generally break into the facility and simply separate the projector from its ceiling mount using common pipe or tube cutting implements. The intruder can file into the cylindrical metal rod that suspends the projector from the ceiling and simply walk away with the projector enclosure and the projector housed therein.

Ceiling-mounted projectors are typically suspended from the ceiling without any type of mounting housing or jacket. Typically, ceiling-mounted projectors are mounted to a ceiling column with a flange at each end. The projector is generally secured to the bottom-mounting flange with small machine screws and inserts molded into the projector case. Other designs provide bulky 2 ft.×2 ft. cages with a cylindrical pipe that offer no protection against thieves who simply unscrew 1 or 2 screws and use a pipe cutter to cut the cylindrical tube. It requires little effort or imagination for one, with the proper tools, to simply "snip through" the exposed cylindrical metal pipe, leaving the projector enclosure. Once removed from the facility, any locks on the enclosure can easily be broken into and the projector removed. Prior art ceiling-mounted projector systems do not incorporate safety mechanisms to deter and prevent theft other than perhaps a simple, cage-like enclosure, which does little to stop theft. What is needed is a security system that prevents theft of AV units or at least forces an intruder to spend an inordinate amount of time attempting to separate the AV unit enclosure from its mount, so that authorities can intervene.

It is, therefore, desirable to provide an AV unit security apparatus that deters theft of an audio/visual projector, television, VCR or the like by enclosing the projector in a rigid protection jacket and coupling the jacket to a ceiling or wall-mounted security link, whereby the security link covers the mounting column extending from the ceiling to protect against the theft and/or destruction of AV unit via the use of tube or pipe cutters.

It is also desirable to provide an AV unit security apparatus that prevents theft of ceiling and/or wall-mounted projectors while still allowing full rotation, movement and tilting of the projector within a housing so as not to inhibit the projector's proper use.

SUMMARY OF THE INVENTION

The present invention advantageously provides a mounting and security system for ceiling and wall-mounted AV units. The invention includes two primary components: a mounting assembly and a locking assembly. The mounting assembly includes height-adjusted mounting columns and allows for the AV unit within its enclosure, to be secured to a sturdy upper support structure and raised or lowered to specified heights thereby, in turn, raising and lowering the audio/visual unit, which extends below a lower ceiling and is suspended within a room. A ceiling tracking mechanism further allows the AV unit to be moved forward and aft should a new location for the audio/visual unit be desired. The locking assembly provides a jacket to enclose the projector while further providing a suspension device that allows full multi-planar rotation of the projector. A retaining collar rotatably receives a portion of the mounting column. The rectangular design of the mounting columns and the cooperation between the suspension device and the AV unit enclosure prevents unwanted removal of the AV unit jacket from the mounting columns.

In accordance with an aspect of the present invention, an audio/visual unit security apparatus is provided. The apparatus provides a height adjustable mounting assembly that includes a mounting column, and a locking assembly rotatably coupled to the mounting column. The locking assembly includes an enclosure for housing the audio/visual unit, and a security collar for removably receiving the mounting column and for covering exposed portions of the mounting column.

According to another aspect of the present invention, a ceiling-mounted audio/visual unit security apparatus is provided. The apparatus includes a height adjustable mounting assembly having a support column affixed at one end to an upper support surface, and a height adjustable mounting column adjustably mounted alongside the support column, wherein a portion of the mounting column extends below a lower support surface for coupling to the locking assembly. Finally, a locking assembly rotatably coupled to the mounting column is provided. The locking assembly includes an enclosure for housing the audio/visual unit, and a security collar for removably receiving the mounting column and for covering exposed portions of the mounting column.

In yet another aspect of the present invention, a wall-mounted audio/visual unit security apparatus is provided. The apparatus includes a mounting assembly having a substantially horizontal support column extending from the wall and a mounting column coupled to the support column. A locking assembly rotatably coupled to the mounting column is also provided. The locking assembly includes an enclosure for housing the audio/visual unit, and a security collar for removably receiving the mounting column and for covering exposed portions of the mounting column.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein like designations refer to like elements, and wherein.

DETAILED DESCRIPTION OF THE INVENTION

The present invention is a security locking system for audio/visual units such as projectors, videocassette recorders, televisions, DVD players (collectively "AV units") and the like that mounts and secures the AV unit while deterring and preventing theft and damage to the unit.

Figure 1:
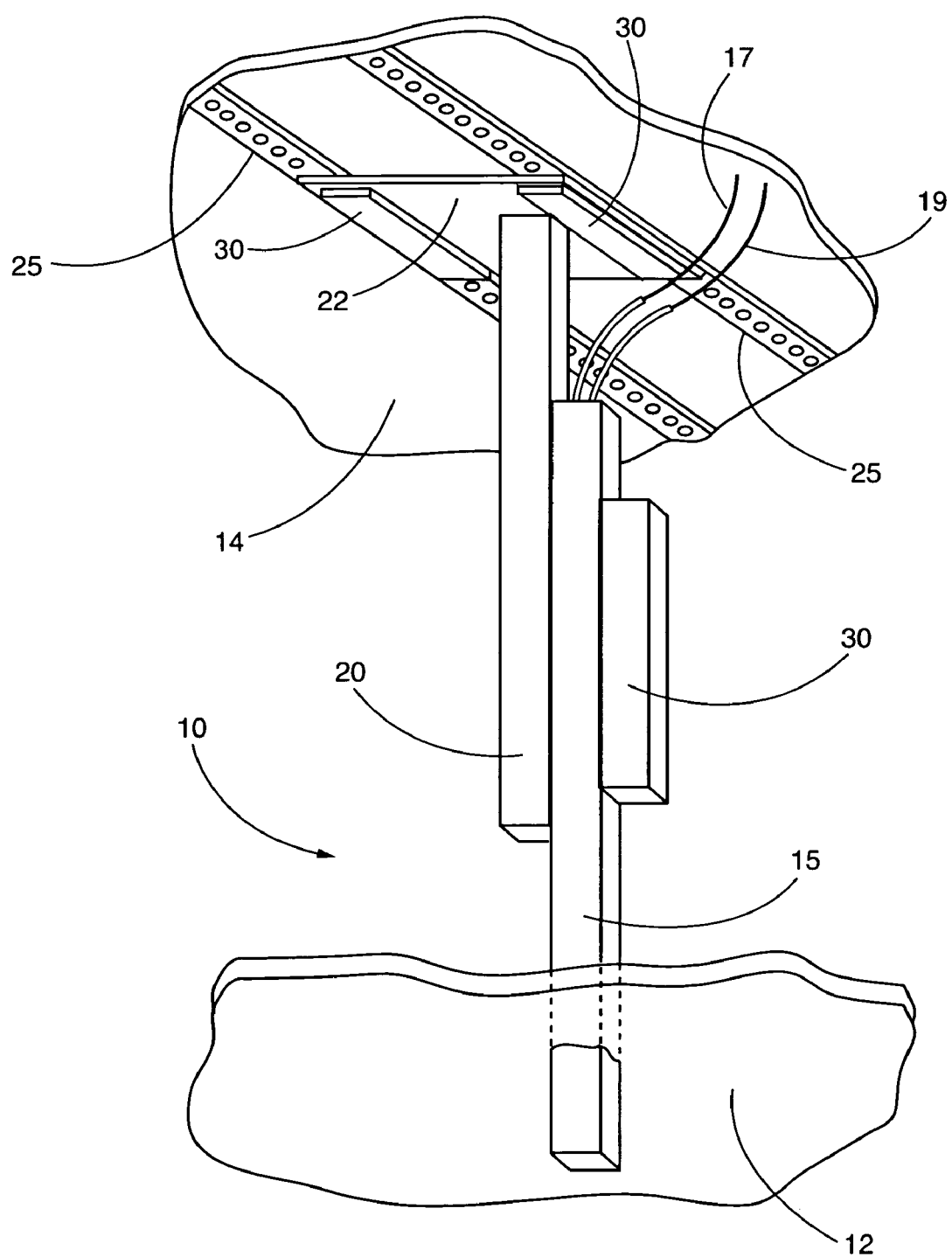
FIG. 1 is a perspective view of the mounting assembly of a ceiling-mounted embodiment the present invention.
Figure 2:
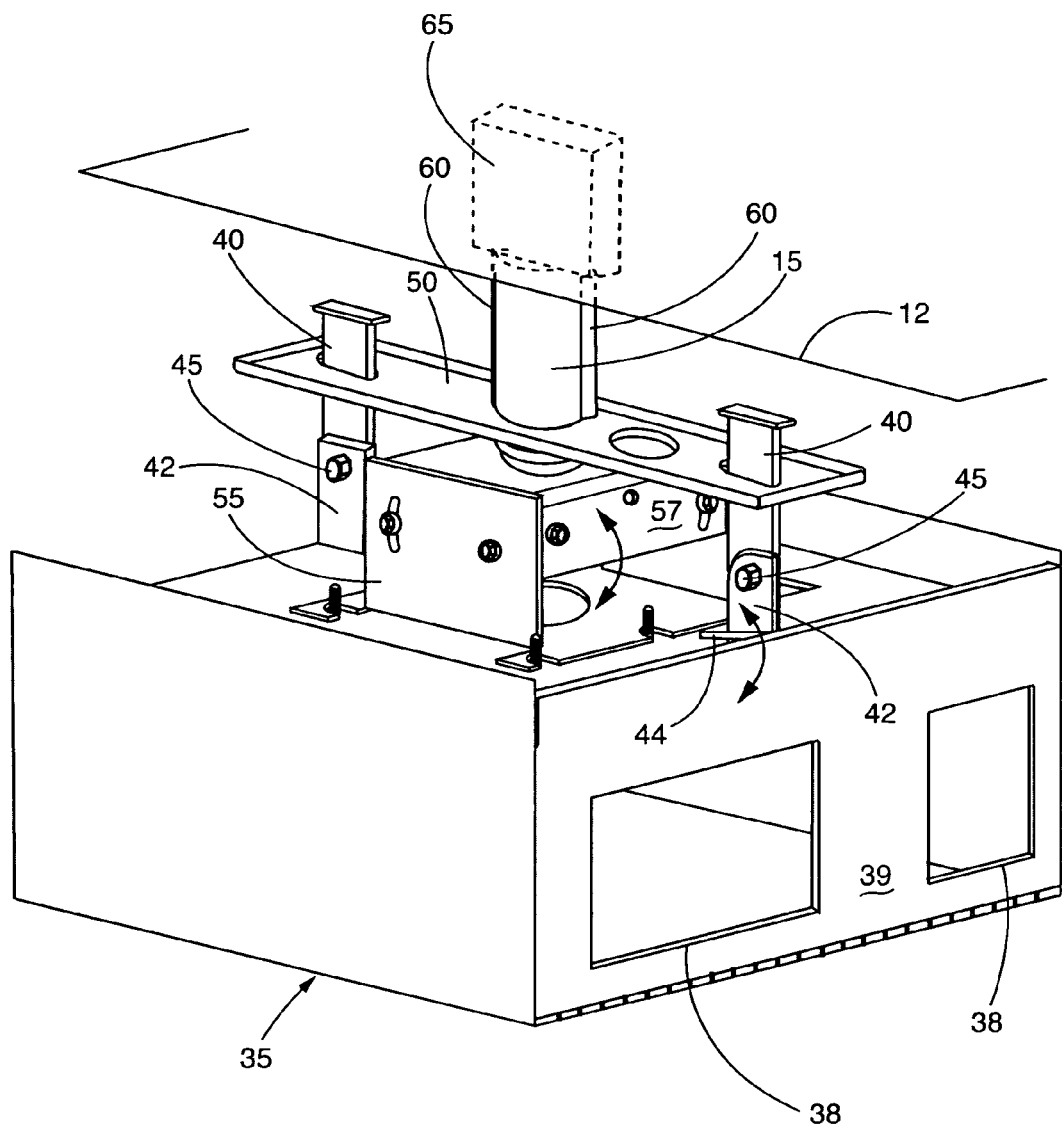
FIG. 2 is a perspective view of the locking assembly of a ceiling-mounted embodiment of the present invention.

The invention includes two primary components: a mounting assembly and a locking assembly. Referring now to the drawing figures in which like reference designations refer to like elements, FIG. 1 shows a mounting assembly 10 of the present invention. The view shown in FIG. 1 represents the view of the mounting assembly 10 of a ceiling-mounted embodiment of the present invention. The view in FIG. 1 represents the components of the mounting assembly within a crawlspace or attic between a lower support structure 12, which represents the ceiling of a room below the crawlspace in which the AV unit is to be housed and an upper support structure 14. The portion of the present invention that houses the AV unit 10 (i.e. the locking assembly), extends below ceiling 12 and is shown in FIG. 2.

The mounting assembly 10 of the present invention includes components that provide maneuverability, and added security to the AV unit that extends below ceiling 12. Mounting assembly 10 is comprised of a height-adjustable column mount 15 that can be raised and lowered to any desired height during installation. Column mount 15 extends down through an aperture in ceiling 12, where it projects through the other side of the ceiling and is secured to a jacket 35 that houses the AV unit (shown in FIG. 2). Column mount 15 is movably engaged with ceiling plate column 20. In one embodiment, column mount 15 is secured alongside plate column 20 via conventional means including the use of setscrews or bolts, which are projected through aligned apertures in each column. Various apertures are placed in the adjacent columns. Column mount 15 may be raised and/or lowered by simply unthreading the screws, re-aligning the apertures in the columns, and threading the screws between newly-aligned apertures to secure the column mount 15 at a desired height. Column mount 15 may be raised and/or lowered until the AV unit within jacket 35 (below ceiling 12) reaches a desired height. Once a proper height is attained, the adjustment screws can be tightened, securing mount 15 against ceiling plate column 20 to maintain column mount 15 at its chosen location. The adjustment screws may be hidden from sight within column mount 15 behind a locking security shield 30 to further deter theft.

In an alternate embodiment, column mount 15 may be telescopically mounted within plate column 20, thereby allowing column mount to be raised or lowered telescopically via conventional means until a desired height is attained whereby column mount is secured. It is within the spirit of the invention to employ any conventional means to allow column mount 15 to be raised or lowered, and then secured at a chosen height in order to raise or lower jacket 35 to its desired position.

The adjustable column mount 15 is preferably formed of rectangular-shaped metal rather than traditional cylinder-shaped tubing in order to prevent the use of traditional tube or pipe cutting tools that are often utilized to separate the jacket (and AV unit) from its mount. However, other shapes may be used, preferably with non-rounded edges. In this fashion, common pipe cutting devices would be rendered ineffective. Elongated security flanges may be secured to either side of column mount 15 to further prevent an intruder from cutting directly into the column mount.

Column mount 15 may contain internal raceways to house both power cables 17 and signal cables 19. The power cables 17 are typically sheathed in flexible metal conduit as per national electrical code standards. The power cables 17 and signal cables 19 can pass through the interior raceways of the column mount 15 and exit the column below ceiling 12 proximate the AV unit for easy and organized coupling to the unit.

The adjustable column mount 15 is adjacent and coupled to a ceiling plate column 20. Column 15 may also be made of a fixed, custom height to avoid the need for height-adjustment hardware. The ceiling plate column 20 is also preferably comprised of metal, and of a non-rounded, preferably rectangular configuration. A metal plate 22 is affixed to the top of ceiling plate column 20. Plate 22 may be affixed directly to upper ceiling 14. The plate 22 may be welded to the top of ceiling plate column 20. Alternately, plate 22 may be affixed to the top end of plate column 20 via conventional screws and/or bolts. Plate 22 may be secured either directly to upper ceiling 14 or affixed to an adjustable ceiling track mechanism 25, which is secured to the upper ceiling 14. Ceiling track mechanism 25 is installed on upper ceiling 14 above the desired location of the AV unit and receives top plate 22 of ceiling plate column 20. The adjustable ceiling track mechanism 25 allows for forward and aft adjustments of ceiling plate column 20 to accommodate future AV unit changes requiring different throw distances. If a new AV unit location is desired, a new aperture is created in ceiling 12, column mount 15 is retracted above ceiling 12 by loosing the screws aligned with plate column 20, and plate 22 is readjusted along track mechanism 25 until column 20 is aligned over a new aperture in ceiling 12. Column mount 15 is then lowered into the new aperture, and jacket 35, containing the AV unit reattached to the bottom portion of column mount 15, in its new location. Plate 22 is slidably secured to track mechanism 25 via conventional means, such as setscrews through aligned apertures in plate 22 and track mechanism 25. Once the plate is moved along the track to its desired location, the plate is once again secured to the track mechanism.

One or more locking security shields 30 serve to shield and protect all mounting and adjustment hardware in order to further thwart an intruder's attempts to remove the AV unit from upper ceiling 14 by unscrewing the adjustment mounting bolts. The security shields 30 may be mounted at various locations of the security system, including but not limited to, the adjustable ceiling track mechanism 25, the column mount plate 22 (shown in FIG. 1) and the adjustable column mount 15. The mounting assembly portion of the present invention is designed to both prevent theft of the AV unit if an intruder gains access to the crawlspace between ceiling 12 and upper ceiling 14 and to provide added maneuverability to the security system. Columns of unconventional shapes and dimensions and locking security shields help thwart intruders by making it extremely difficult to cut into the mounting columns to separate the mounting assembly from the locking assembly (and the AV unit housed therein). Further, column mount 15 is height-adjustable, to allow for simple relocation of the column mount in order to accommodate a new location of the AV unit.

FIG. 2 shows the locking assembly portion of the present invention, for a ceiling-mounted AV unit. An AV unit jacket 35 encases and secures the AV unit (not shown). The jacket 35 can be sized to receive various sized AV units. One or more cooling vents (not shown) are provided in jacket 35 for adequate ventilation for the AV unit. Control and interface panel openings 38 are also provided. Openings in jacket 35 are obviously small enough to prevent an intruder from simply slipping the AV unit out through these openings. A hinged locking door 39 allows for the unit to be easily slid into and out of jacket 35. Openings or perforated sections of jacket 35 accommodate the AV unit's speakers.

Jacket 35 is preferably comprised of sturdy material such as metal and completely encloses the AV unit. In prior art security systems, the enclosure housing the AV unit is linked directly to its column mount without any hardware to protect the mount, or with minimal hardware such as security screws, thereby allowing an intruder to simply cut the column at the column-enclosure interface. The present invention provides additional protection by including various security links and a suspension security yoke, to prevent easy separation of the jacket from the mount at the interface.

Affixed to the top of jacket 35 are one or more security links 40. These links 40 are, preferably, elongated, stiff metal bars that are coupled and secured to the top of jacket 35 via padlocks or bolts 45. Other conventional locking devices may also be used. Security links 40 allow for the interface of jacket 35 with the portion of the adjustable column mount 15 that projects below ceiling 12 as shown in FIG. 2. The portion of column mount 15 shown in FIG. 2 may be substantially cylindrical to allow for column mount 15 to be easily inserted in a conventional manner into an aperture at the top of jacket 35. An APR (Azimuth, Pitch and Roll) flange 55 is secured to the top of jacket 35 via conventional securing means. APR flange 55 is comprised of opposing walls with a swiveling mounting bar 57 rotatably secured therebetween. The swiveling bar of APR flange 55 includes an aperture therein to receive an end of column mount 15. Power and signal cables 17 and 19 travel through the raceway of column mount 15, through the aperture in the swiveling bar of APR flange 55 and through an opening in the top of jacket 35 to connect to the AV unit therein. The end of column mount 15 is received within the aperture of the swiveling bar of APR flange 55 via conventional means such as providing threads on the bottom of end of column mount 15 which are received by thread-receiving ridges within the aperture of mounting flange 15. Therefore, once column mount 15 is inserted into APR flange 55, the jacket 35 that houses the AV unit may be rotated in any plane thereby allowing the AV unit to be rotatably adjusted to any desired angle.

Security links 40 contain an aperture at each of its ends. The lower aperture of each security link 40 is aligned with a corresponding tab 42 projecting up from the top of jacket 35. An aperture in each tab 42 is aligned with the aperture in the lower end of security link 40 and a lock is inserted through the aligned apertures to secure the security links 40 to the top of jacket 35. A suspension security yoke 50 captively receives the upper portion of each security link 40 and provides the connection between the AV unit jacket 35 and column mount 15. The suspension yoke 50 further includes a retaining aperture that receives and retains a portion of the column mount 15. There is, therefore, a multiple layer of protection around the vital column mount-jacket link. First, the lower end of column mount 15 enters swiveling mounting bar 57 of APR flange 55 before its insertion into the top of jacket 35. APR flange, while allowing rotation of jacket 35 also provides an extra layer of protection surrounding column mount 15. Suspension yoke 50 provides an added layer of protection. It accomplishes this by linking column 15 to jacket 35, not only via the column mount-APR flange interface but also by receiving security links 40. Security links 40 are securely fastened at their one end to the jacket 35, via a lock inserted through aligned apertures in the links and the jacket tabs. Security links 40 include an elongated flange on each upper end, which prevent the links from slipping through holes in the suspension yoke 50 through which they have been inserted. This additional layer of protection provides another mechanical link between the column mount 15 and the jacket 35. Further, suspension yoke 50 in conjunction with security links 40 and APR flange 55 allow for full pan tilt and tilt motion as is required to position and set up an AV unit. The AV unit has freedom to be titled in all three axes for azimuth, pitch and roll adjustments.

The portion of column mount 15 extending down thorough ceiling 12 is preferably cylindrical to allow the end of column mount 15 to be easily threadably received by APR flange 55. To further prevent an intruder form attempting to cut the small exposed section of the column mount (i.e. the exposed section of the column mount just under ceiling 12 and just above yoke 50), one or more elongated security members 60 may be affixed to the exposed column mount 15. These members may either be welded directly to the column or affixed thereto. Again, by providing one or more members to the exposed column mount, the shape of the exposed column is altered to something other than a traditional cylindrical pipe shape, thereby providing another means of preventing the use of conventional metal tube cutting devices, which are typically effective on only cylindrically-shaped pipes.

The configuration in FIG. 2 provides a security "shield" around column mount 15 and the AV unit housed therein, therefore making it very difficult to separate jacket 35 from its column mount 15. The yoke 50, retaining collar and security flanges around the exposed portion of column mount 15 thwart the use of traditional pipe and tube cutters while the padlocks prevent the separation of the projector jacket from its column mount.

The locking system of the present invention protects the mounting column 15 from which the AV unit jacket 35 is suspended, while still allowing the AV unit to rotate and tilt so as not to inhibit the unit's capabilities. The APR device 55 maintains the azimuth, pitch and roll of the AV unit. One or more hanger brackets within the interior of jacket 35 assist in mounting the AV unit within jacket 35. Jacket 35 preferably includes a hinged door 39 that opens outward when pulled down by a rotatable latch 44 extending from the upper portion of the door. Other door configurations that allow for the insertion and removal of the AV unit are also compatible with the invention. The rotatable latch 44 includes an aperture therein. One of the tabs 42 projecting up from the top of the jacket 35 receives the aperture of door latch 44 when the door is in the closed position. Therefore, the lock that secures the security link 40 to tab 42 also secures door latch 44 thereby preventing any unwanted opening of the jacket 35. To open the door, the lock is opened, and door latch 44 is lifted and pulled down. This serves to open hinged door 39 of jacket 35 to allow for insertion/removal of the AV unit. When the door of jacket 35 is unlocked, the hanger brackets within jacket 35 allow the AV unit to be easily slid into place or be removed for service.

Figure 3:
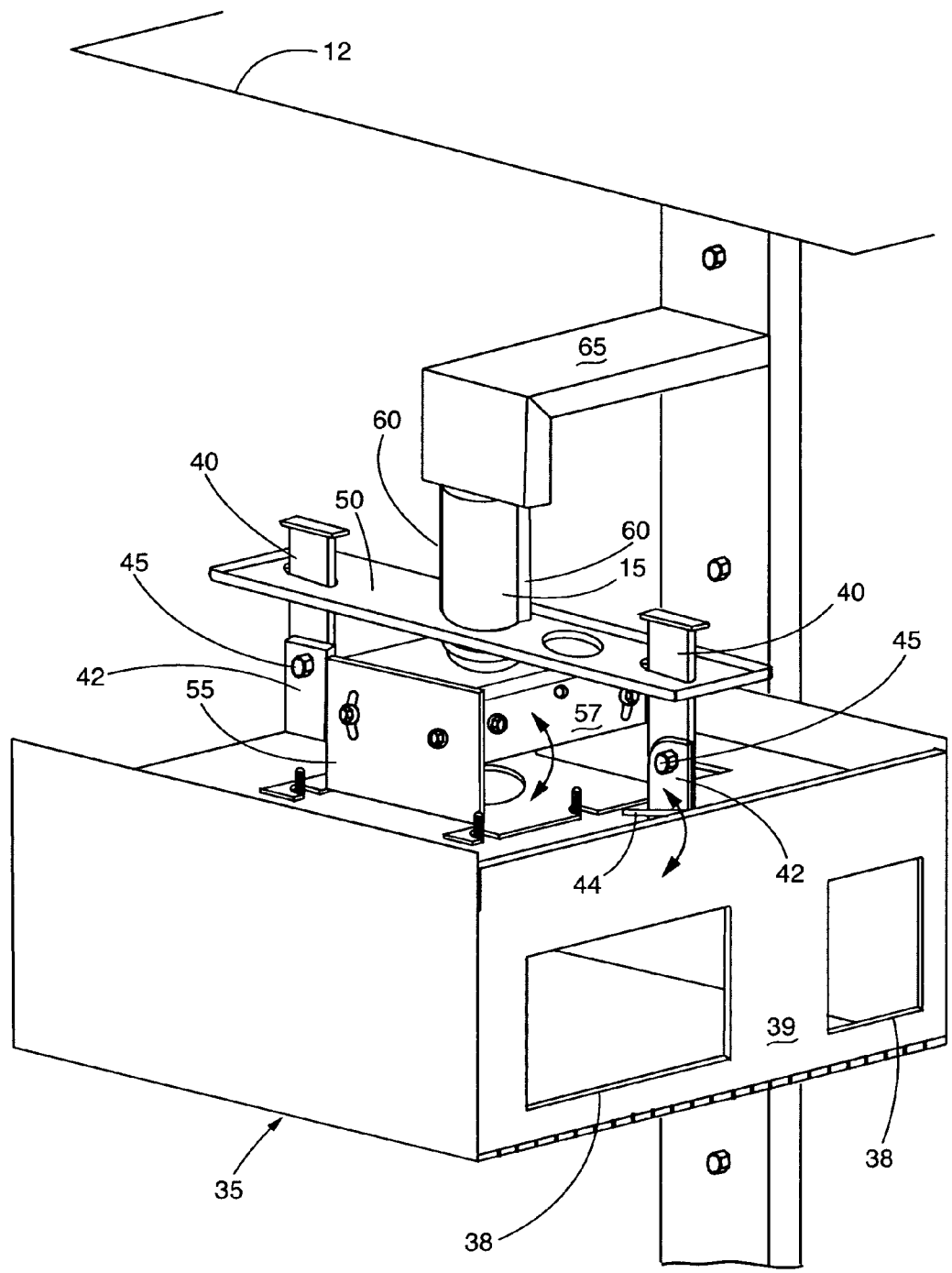
FIG. 3 is a front view of a wall-mounted embodiment of the present invention.

FIG. 3 illustrates a wall-mounted embodiment of the present invention. The wall-mounted version of the present invention includes the same locking assembly components as in the ceiling-mounted version. However, instead of the column mount 15 extending up through a ceiling, a substantially horizontal arm 65 extends from a wall 68 and is coupled to a support column that is coupled to the locking assembly (i.e., APR flange 55, security links 40, jacket 35).

In one embodiment of the invention, the AV unit security system includes an alarm system. In this embodiment, one or more alarm sensors can be mounted on the mounting assembly and/or locking assembly. The alarm sensors can detect vibration, shock or the cutting of a closed imbedded electrical connection. Upon detection, the alarm system can initiate a local alarm or transmit a warning signal either to a console within the facility or to a remote console. Further, the signal can be received by a cellular telephone, a pager or a computer via e-mail.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An audio/visual unit security apparatus for protecting the audio/video unit comprising:
   a height adjustable mounting assembly including a mounting column;
   a locking assembly rotatably coupled to the mounting column, the locking assembly comprising:
   an enclosure for housing the audio/visual unit; and
   a security collar for removably receiving the mounting column and for covering exposed portions of the mounting column, wherein the security collar comprises:
      a mounting flange affixed to the enclosure, the mounting flange further a swivel member arranged to allow the enclosure to rotate in multiple planes, wherein the swivel member receives a portion of the mounting column;
      a suspension yoke to receive a portion of the mounting column; and
      one or more security links coupling the enclosure to the suspension yoke.

2. A ceiling-mounted audio/visual unit security apparatus for protecting the audio/video unit comprising;
   a mounting assembly comprising a support column affixed at one end to an upper support surface, and a height adjustable mounting column being adjustably mounted alongside the support column;
   a locking assembly coupled to the mounting column, the locking assembly comprising: an enclosure for housing the audio/visual unit; and
   a security collar for removably receiving the mounting column and for covering exposed portions of the mounting column, wherein the security collar comprises:
      a mounting flange affixed to the enclosure, the mounting flange further a swivel member arranged to allow the enclosure to rotate in multiple planes, wherein the swivel member receives a portion of the mounting column;
      a suspension yoke to receive a portion of the mounting column; and
      one or more security links coupling the enclosure to the suspension yoke.

\* \* \* \* \*